(No Model.) 4 Sheets—Sheet 1.

A. MORISON.
FLAX BRAKE AND SCUTCHER.

No. 463,125. Patented Nov. 10, 1891.

Witnesses
H. F. Dewey.
Orlando L. Partridge.

Inventor
Alexander Morison (No Model.)  4 Sheets—Sheet 2.

A. MORISON.
FLAX BRAKE AND SCUTCHER.

No. 463,125.  Patented Nov. 10, 1891.

Witnesses:
J. S. Dewey
Orlando L. Partridge

Inventor:
Alexander Morison

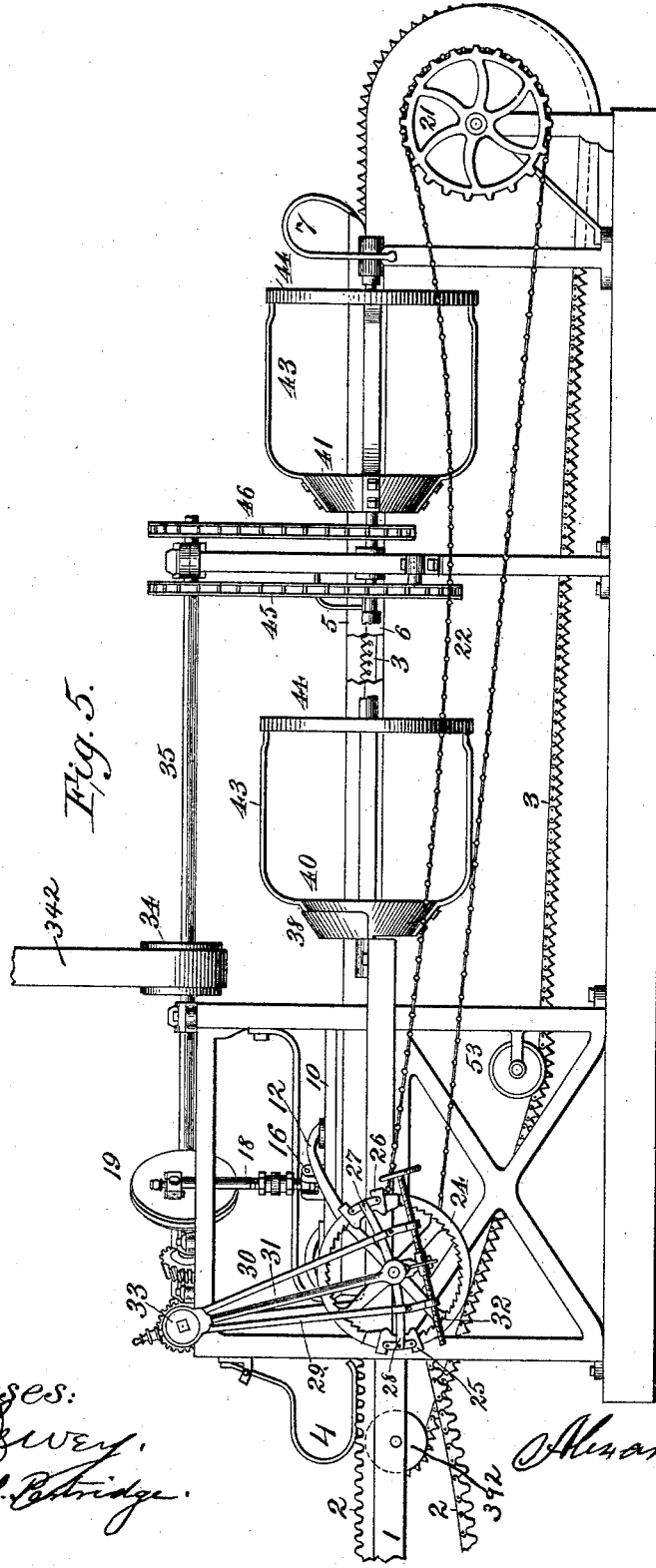

(No Model.) 4 Sheets—Sheet 4.
A. MORISON.
FLAX BRAKE AND SCUTCHER.
No. 463,125. Patented Nov. 10, 1891.
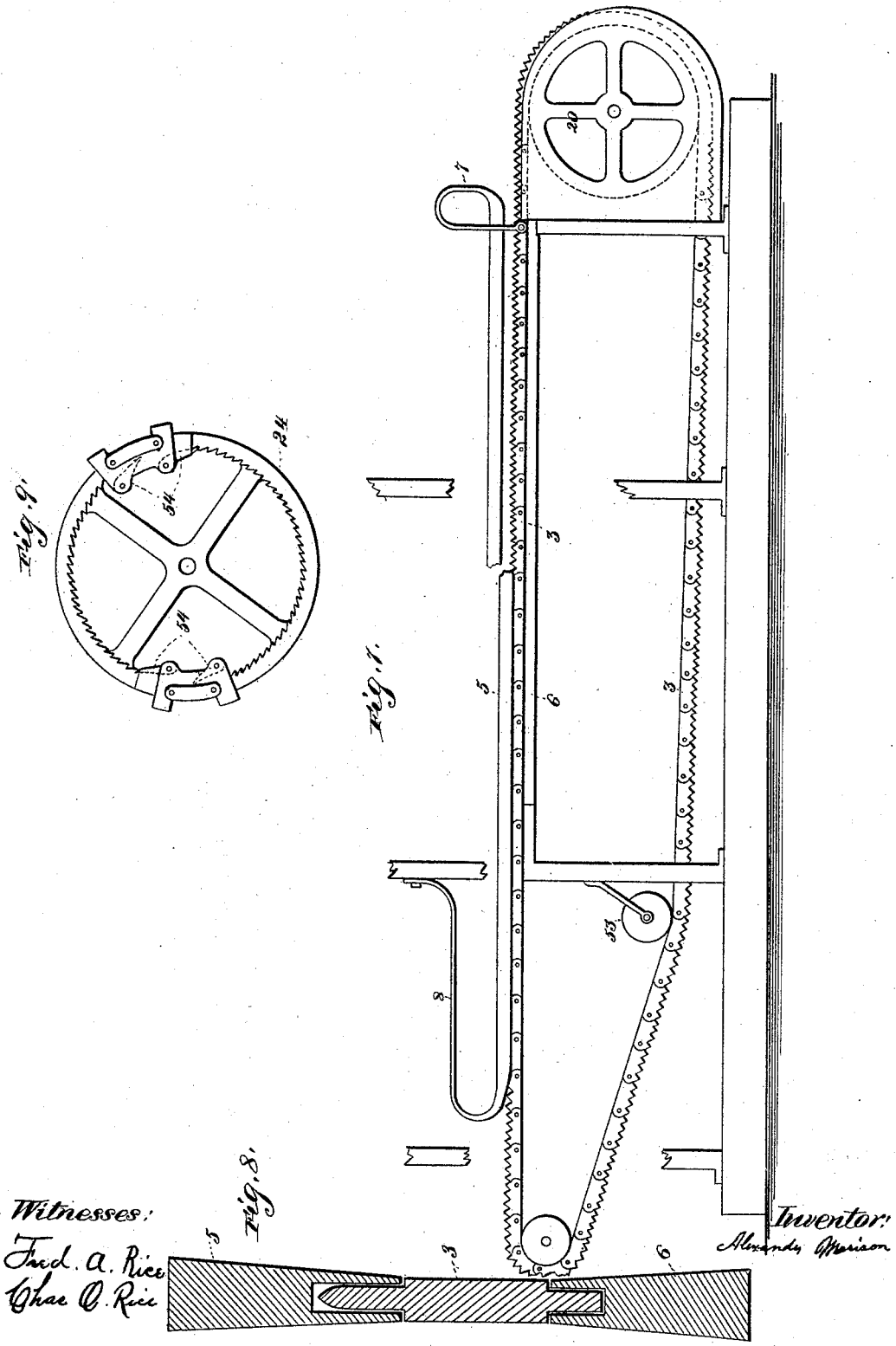

UNITED STATES PATENT OFFICE.

ALEXANDER MORISON, OF ALPENA, MICHIGAN.

FLAX BRAKE AND SCUTCHER.

SPECIFICATION forming part of Letters Patent No. 463,125, dated November 10, 1891.

Application filed November 10, 1890. Serial No. 371,006. (No model.)

*To all whom it may concern:*

Be it known that I, ALEXANDER MORISON, machinist, a citizen of the United States, residing at Alpena, in the county of Alpena and State of Michigan, have invented a new and Improved Flax Brake and Scutcher, of which the following is a full, clear, and exact description.

My invention relates to improvements in flax-brakes in which vertically-acting jaws operate in conjunction with a fixed jaw or table for crushing the stalks and then deliver the same to scutchers to strip the fiber of the refuse.

It also relates to improvements in apparatus for regulating the speed of the feed.

I attain the objects by the mechanism illustrated in the accompanying drawings, in which—

Figure 1:
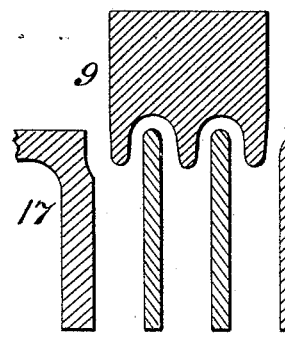
Figure 2:
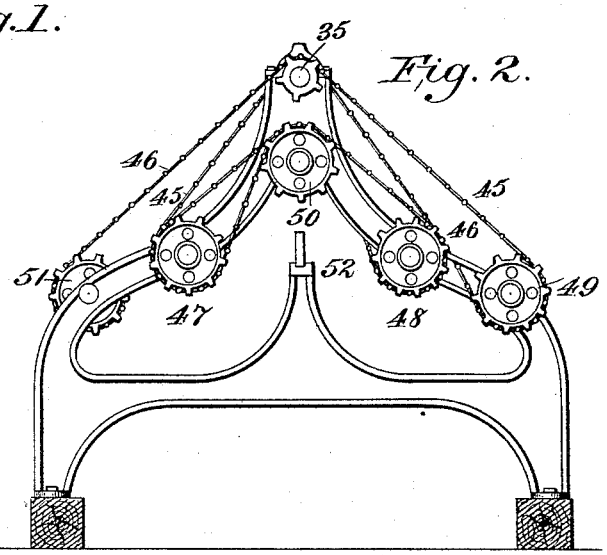
Figure 6:
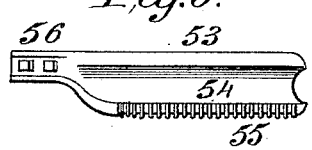
Figure 3:
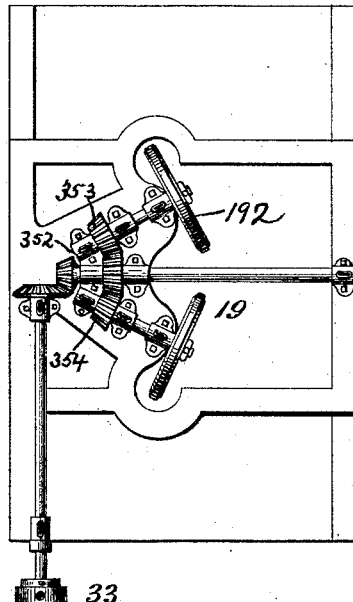
Figure 4:
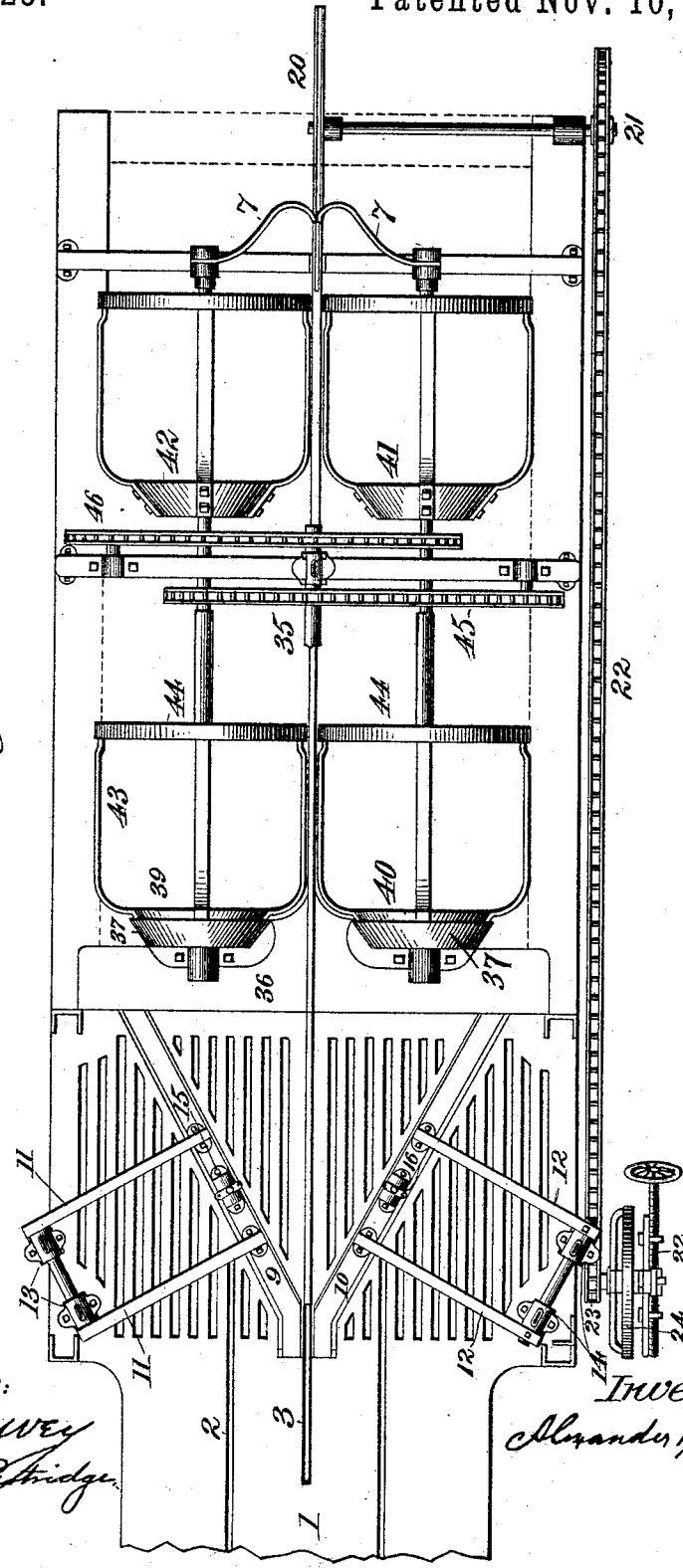

Figure 1 is a cross-section of the jaws of the machine which act as a brake. This is drawn to a much larger scale than the other figures. Fig. 2 shows the arrangement of driving-chains and sprocket-wheels for driving the scutchers, hereinafter described. Fig. 3 is a vertical projection of the driving-gear, frame-work, and main shaft. Fig. 4 is a plan of the machine with that portion represented in Fig. 3 removed. Fig. 5 is a side view of the entire machine. Fig. 6 is a view of one of the scutcher-blades. Fig. 7 is a side view of the carrier-chain, the carrier-bar, the pressure-bar, the pressure-bar springs, the grooved driving-wheel for driving the carrier-chain, the grooved tightener-wheel, and the grooved wheel in the table. Fig. 8 is a full-sized cross-section of the carrier-bar, carrier-chain, and pressure-bar. Fig. 9 is a view of the ratchet-wheel for increasing or diminishing the speed of the feed, the dogs being shown in dotted lines.

1 is a table having two endless chains 2 2, running in longitudinal grooves upon the surface thereof, and passing around grooved pulleys which are fixed to the shaft of ratchet-wheel 24, which shaft extends across the machine, under the grating shown in Fig. 4, close to jaws 9 and 10.

3 is a carrier-chain starting at a grooved pulley in the table in front of jaws 9 10, and passing along a grooved carrier-bar 6 of Figs. 5, 7, and 8. The teeth of this endless carrier-chain extend up into a groove in the inferior surface of the pressure-bar 5. (Shown in Figs. 5, 7, and 8. A portion of the pressure-bar 5 and carrier-bar 6 are shown cut away at the upper 3 of Fig. 5, and in Fig. 7 one-half of the pressure-bar is shown detached and elevated.

5 is a grooved pressure-bar held in place by springs 7 8. Spring 7 is also shown in Fig. 4. The endless carrier-chain 3 passes around a grooved pulley in table 1 and also around a large incased grooved driving-pulley 20, driven by sprocket-wheel 21 and chain 22, extending from a driving sprocket-wheel 23 behind ratchet-wheel 24. (Shown in Fig. 4.)

9 10 are jaws acting vertically, independently, and alternately and supported by arms 11 11 12 12, fixed to shafts acting in boxes 13 14, as shown in Fig. 4. The jaws 9 10 are mounted so as to act diagonally across the upper surface of the straw, which is held at right angles to and across the carrying-chain 3, one of said jaws being diagonal in one direction and extending outward from the carrying-chain or middle part of the straw carried by it to the extreme limit or end of the straw on that side of the chain, thus consecutively bringing all parts of the straw under the break, beginning at the middle and working out toward the end, and at the same time only operating on a single strand of straw at one point at a time. The other of said jaws operates in the same way on the opposite end of the straw; but inasmuch as the two jaws strike alternately there is no tendency to draw the straw endwise by one jaw, while it is held down fast by the other one, and the alternate operation permits the slight giving back and forth of the straw without breaking the fiber. Jaw 10 is actuated by pitman 18, as shown in Fig. 5, said pitman being driven by an eccentric on fly-wheel 19, and jaw 9 is actuated in like manner by fly-wheel 19². (Shown in Fig. 3.) These fly-wheels are driven by belt, pulley-shaft, and bevel-gear, as shown in Figs. 3 and 5.

33 is an eccentric, having attached thereto by suitable collar pitmen 29 30, the said pitmen being fastened to the collar by suitable flexible joints. (Not shown.) Shaft 31 is firmly fixed to said collar to hold it from turning. At the lower extremity of shaft 31 are fastened arms 27 28, each being pivoted to the axle of ratchet-wheel 24 and having at their outer extremities clasps 25 26, these clasps each being provided with suitable dogs 54 55 for engaging the teeth on the inner surface of the periphery of ratchet-wheel 24, the dogs 54 in clasp 25 pointing upward and those in 26 downward, as shown in Fig. 9.

32 is a double screw for adjusting arms 29 30, so as to regulate the speed of ratchet-wheel 24.

To the axle of ratchet-wheel 24 is fixed a sprocket-wheel 23, which drives the endless chain 22 and sprocket-wheel 21 and a large incased grooved pulley 20, as shown in Figs. 4 and 7, thus driving feed-chain 3.

39 40 41 42 are scutchers so constructed and revolved by endless chains 45 46 as to whip and scrape the fiber after it has been broken by jaws 9 10. Scutchers 39 40 revolve in opposite directions and whip the ends of the fiber upward, while 41 and 42 in like manner whip it downward, the middle of the fiber being firmly held between the teeth of the carrier-chain and the pressure-bar. The ends of the arms or knives of the scutchers, as 43, are held firmly by bands, as 44. Their shafts are incased to prevent the winding on of the fiber. Endless chains 45 46, actuated by sprocket-wheels on the main shaft 35, drive the sprocket-wheels 47 48, attached to the shafts of scutchers 39 40, and also two other sprocket-wheels behind 39 40 of Fig. 2, which drive scutchers 41 42.

49 50 51 of Fig. 2 are idlers to enable the chain to give proper direction to the scutchers.

52 is the central support for the carrier-bar which carries and guides the endless carrier-chain 3.

53 is a tightener and guide for carrier-chain 3.

The operation of my machine is as follows: The flax or other fibrous material to be operated upon is laid transversely upon table 1 and is conveyed by endless carrier-chains 2 2 under spring 4, where it is caught at the middle by the endless carrier-chain 3. By this it is drawn in between carrier-bar 6 and pressure-bar 5 and between the jaws 9 10 above and a suitable fixed grating and jaws below, by which it is thoroughly broken, and thence on till it arrives at the revolving scutchers 39 40, by which it is thoroughly whipped and scraped from the under side. The flax is firmly gasped and held at the center by the grooved pressure-bar crowding it between the teeth of the chain. The fiber being now scraped from the under side is conveyed to the second pair of scutchers 41 42, by which it is whipped and cleaned from above, after which it is delivered from the carrier-chain by the disappearance of said chain within the casing of wheel 20, as shown in Fig. 5. The caps 38 37 are shields to prevent the fiber from winding onto the cone frustums 40 39.

The speed of carrier-chain 3 is increased by turning the double screw 32 so as to decrease the divergence of pitmen or shafts 29 30, and is decreased by increasing their divergence, for it will be seen that the nearer together the lower extremities of pitmen 29 and 30 are the greater the sweep given to the outer extremities of arms 27 28, while the farther they are separated the less the sweep given to the extremities of arms 27 28, and hence the slower the motion given to ratchet-wheel 24, which propels the driving-chain 22.

Feed-chains 2 2 in table 1 are driven by sprocket-wheels fixed to the driving-shaft which forms the axle of ratchet-wheel 24, said shaft extending across beneath the grated plate which forms the under jaw. This grated plate or under jaw is provided with diagonal flutings or bars of suitable form to properly engage the corresponding flutings on the inferior surface of the upper jaws, as shown in cross-section at Fig. 1. This grating permits the waste to drop through.

I do not confine myself to any particular form for jaws 9 10, since they may be made in two pieces extending diagonally from the center outward, as shown in the drawings, or in two pieces lying parallel to one another and starting from different points near the carrying-chain or in a straight bar extending diagonally across the grated surface and be actuated by one pitman or more; nor do I confine myself to the particular form for the scutchers here shown, nor to any particular number of scutcher knives or arms or form or manner of attachment for the same; nor do I confine myself to any particular form or manner of driving the feed-chains 2 2 and 3, nor to any particular manner of increasing or diminishing their speed.

What I claim as my invention, and desire to secure by Letters Patent, is—

1. In a machine for cleaning flax or other vegetable fiber, in combination with a carrier adapted to move the fiber forward, a vertically-acting movable jaw, and a fixed jaw arranged diagonally across the path of the moving fiber, substantially as and for the purpose described.

2. In a machine for cleaning flax or other vegetable fiber, in combination with a carrier adapted to grasp the fiber at a central point, a pair of break-jaws, each consisting of a fixed and movable member lying diagonally across the path of the moving fiber and adapted to operate alternately upon the stems of said fiber and thereby break the same without straining it endwise against the pull of the opposing pair of jaws, substantially as and for the purpose described.

3. In a machine for cleaning flax or other vegetable fiber, the combination of a carrier and break-bars lying diagonal to said carrier, the said carrier being adapted to grasp the stems at a central point and carry them forward sidewise between the said jaws, and the said jaws being located diagonally across the line of feed, substantially as and for the purpose described.

4. In a machine for cleaning flax or other vegetable fiber, the combination of a carrier, break-jaws arranged diagonally to the path of said carrier, and a grated table, substantially as and for the purpose described.

5. In a machine for cleaning flax or other vegetable fiber, a carrier-chain, a supporting carrier-bar arranged to support and guide said carrier-chain, a grooved pressure-bar arranged to rest over points extending upward from said carrier-chain and to be held in position by pressure-springs, and means for moving forward said carrier-chain, substantially as and for the purpose described.

6. In a machine for cleaning flax or other vegetable fiber, the combination of a carrying-chain, a guiding grooved carrier-bar, a pressure-bar resting over projections extending upward from said carrying-chain, and revolving scutch-knives adapted to scutch and comb outward from the holding point of the carrier-chain and pressure-bar the broken stems and thereby separate the same from the fiber, substantially as and for the purpose described.

7. The combination of a ratchet-wheel, ratchet-pawls mounted on arms radial to said wheel, and links adjustable radially on said arms and connected to a common vibrating driver, whereby continuous rotary motion is produced on said ratchet-wheel from the vibrating motion of said driver, and whereby also the speed of the continuous rotary motion of said ratchet-wheel may be regulated, substantially as and for the purpose described.

8. In a machine for cleaning flax or other vegetable fiber, a thin carrying-chain having depressions on its upper surface to receive the stems of material to be treated, and a pressure-bar resting above such carrying-chain and arranged to press upon the said stems and hold the same firmly in the depressions, and thereby hold said stems as the same move forward under the operating break-jaws and scutching-knives, substantially as and for the purpose described.

9. In a machine for cleaning flax or other vegetable fiber, a scutcher-blade having an anterior plain dulled edge, a concave exterior face, and a posterior combing edge, substantially as shown.

10. In a machine for cleaning flax or other vegetable fiber, the combination of feed-chains 2 2, carrier-chain 3, jaws 9 10, and grooved bars 5 6, with scutchers 39 40 41 42, substantially as presented and described.

ALEXANDER MORISON.

Witnesses:
F. T. DEWEY,
A. J. SIMMENS.